United States Patent [19]

Iino et al.

[11] Patent Number: 4,855,768

[45] Date of Patent: Aug. 8, 1989

[54] DIGITAL PRINTING APPARATUS

[75] Inventors: Shuji Iino; Akihito Ikegawa, both of Osaka, Japan

[73] Assignee: Minolta Camera Kabushiki Kaisha, Japan

[21] Appl. No.: 251,031

[22] Filed: Sep. 26, 1988

Related U.S. Application Data

[63] Continuation of Ser. No. 175,244, Mar. 30, 1988, abandoned.

[30] Foreign Application Priority Data

Mar. 31, 1987 [JP] Japan .................................. 62-80802

[51] Int. Cl.4 ............................................ G01D 15/00

[52] U.S. Cl. ................................ 346/160.1; 346/155; 346/105

[58] Field of Search .................. 346/153.1, 160.1, 155, 346/105; 355/3 DR, 352, 10, 14 D; 400/119; 101/DIG. 13; 118/644, 647, 648, 650, 661

[56] References Cited

U.S. PATENT DOCUMENTS

| | | | |
|---|---|---|---|
| 4,208,965 | 6/1980 | Fichler et al. | 346/155 |
| 4,573,061 | 2/1986 | Fujii et al. | 346/155 |
| 4,725,860 | 2/1988 | Kohyama et al. | 346/160.1 |
| 4,725,861 | 2/1988 | Oda | 346/160.1 |

FOREIGN PATENT DOCUMENTS

| | | | |
|---|---|---|---|
| 54-25418 | 4/1979 | Japan | 346/160.1 |
| 54-25419 | 6/1979 | Japan | 346/160.1 |
| 54-25417 | 7/1979 | Japan | 346/160.1 |

OTHER PUBLICATIONS

Proceedings of 1st Non-Impact Printing Technologies Symposium at Hattsuei Kaikan Hall, Toranomon, Tokyo, Jul. 24 and 25, 1984.

*Primary Examiner*—Arthur G. Evans
*Attorney, Agent, or Firm*—Wenderoth, Lind & Ponack

[57] ABSTRACT

The digital printing apparatus of this invention including ink retaining member of which the surface has a multiplicity of minute ink-wettable dot surfaces being formed as arranged with a fixed pitch in the direction of width of the recording paper. These dot surfaces are enclosed with ink-repellent surfaces. When ink is applied to the entire surface of the ink retaining member, the ink is raised only on the dot surfaces. The digital printing apparatus of this invention is provided with a multiplicity of control electrodes arranged in at least one line as spaced with a fixed pitch equalling the pitch with which the dot surfaces are spaced in the aforementioned direction. When an electrostatic force is applied between selected ones of the control electrodes and the corresponding dot surfaces, the prominences of ink held on the dot surfaces are caused to fly toward the control electrodes and land on the recording paper held between the control electrodes and the ink retaining member.

21 Claims, 5 Drawing Sheets

DIGITAL PRINTING APPARATUS

This application is a continuation of now abandoned application Ser. No. 175,244, filed Mar. 30, 1988.

BACKGROUND OF THE INVENTION

1. Field of the Invention:

This invention relates to a digital printing apparatus for forming an image on a recording medium such as paper by spouting ink onto the recording medium. More particularly, this invention relates to a digital printing apparatus for forming an image on the aforementioned recording medium by causing the ink to be spouted by virtue of electrostatic force in a high electric field.

2. Description of the Prior Art:

An ink jet printer comprises a nozzle for spouting ink in the direction of a recording medium. The ink which has been converted into particles by virtue of surface tension after departure from the nozzle is advanced toward the aforementioned recording medium in accordance with an image signal. The ink jet printer of this construction, however, has a disadvantage that a great effort must be paid to the maintenance of the nozzle so as to prevent ink from clogging the nozzle.

As a new printer for directly recording an image on ordinary paper without use of any nozzle, a "magnetic fluid high-speed printer" has been proposed (Glossary of manuscripts for the First Symposium on Non-impact Printing Technique sponsored by the Society of Electrophotography of Japan on July 24 and 25, 1984, pages 113–118).

This printer comprises a multistylus formed of numerous styluses linearly arranged as regularly spaced in a row and a control electrode disposed at a prescribed distance from the multistylus and adapted to form an electrostatic field of high magnitude between itself and the aforementioned multistylus. In the printer, the recording medium is advanced between the aforementioned control electrode and the aforementioned multistylus. As the ink to be applied to the recording medium, this printer uses a liquid containing magnetic particles namely a magnetic ink. This magnetic ink is supplied to the multistylus. The multistylus is furnished with a magnet to be used for magnetizing the magnet ink. By the magnetic force of this magnet, undulating prominences of magnetic ink are formed at the leading ends of the styluses. When the electrostatic field of high magnitude is formed between selected styluses and the aforementioned control electrodes, it induces flight of the prominences of magnetic ink from the styluses. The printer operates by virtue of the phenomenon of the rise of the magnetic fluid in the magnetic field and the phenomenon of flight of the magnetic fluid in the electrostatic field of high magnitude. The terminal shapes of the prominences of magnetic ink correspond to the meniscuses in the aforementioned ink jet printer. Then the electrostatic force acts on the terminals, the magnetic ink in the leading end part of each of the prominences is forced to gather into a bead about 10 μm in diameter and fly out dragging a tail behind. On the surface of the recording medium, an image conforming to image data is formed by applying an electrostatic force to each of the prominences of ink at the leading end of the multistylus in accordance with the image data and causing selected portions of the prominences of ink to fly toward the recording medium.

In the magnetic fluid high-speed printer of the construction described above, since powerful magnetic force acts on the magnetic particles in the portion of magnetic ink adjoining the multistylus, the affected magnetic particles of the magnetic ink is sedimented and condensed in the ink and consequently suffered to give rise to a highly magnetized portion of high density within the magnetic ink. As the result, the continuous supply of the magnetic ink to the multistylus is impeded. As the recording is continued for a long time, the record is produced with insufficient density. As this condition lasts, the printer eventually fails to produce desired record.

Further in the aforementioned magnetic fluid high-speed printer, the magnetic head which is provided with the multistylus and the ink injector for supplying the magnetic ink to the multistylus inevitably possesses a complicated structure. Moreover, since the magnetic ink is supplied from an ink tank to the aforementioned multistylus by means of a pump, the magnitude of prominence of the magnetic ink is varied by the vertical distance from the aforementioned multistylus to the liquid level inside the ink tank and the image formed on the recording medium lacks stability.

SUMMARY OF THE INVENTION

A main object of this invention to provide a digital printing apparatus which is provided with an ink retaining member possessing an ink retaining surface consisting of a multiplicity of minute dot surfaces possessing wettability for liquid and enabling ink to rise into a multiplicity of dot-shaped prominences by virtue of surface tension and liquid-repellent surfaces adapted to enclose the dot surfaces therein.

Another object of this invention is to provide a digital printing apparatus which is further provided with a multiplicity of control electrodes adapted to form electrostatic fields of high voltage between themselves and selected ones of the multiplicity of minute dot surfaces thereby enabling the prominences of ink adhering to the selected dot surfaces to fly out toward the recording paper.

Still another object of this invention is to provide a digital printing apparatus which is further provided with an ink supplying part adapted to apply ink to the entire surface of the ink retaining member thereby to allow the ink to be retained only on the dot surfaces owing to the action of the liquid-repellent surfaces tending to repel the ink landing thereon and the action of the multiplicity of liquid-wettable dot surfaces tending to retain ink thereon.

Yet another object of this invention is to provide a digital printing apparatus which is enabled to form an image on a recording paper by the use of ink containing no magnetic particle.

A further object of this invention is to provide a digital printing apparatus which is further provided with one line of control electrodes arranged as spaced with a fixed pitch in such a manner that the control electrodes are precisely opposed to those of the dot surfaces which fall in any one of the lines of dot surfaces arranged in the direction of width of a recording paper as spaced with the same fixed pitch as mentioned above.

Another object of this invention is to provide a digital printing apparatus which is provided with a plurality of lines of control electrodes.

Still another object of this invention is to provide a digital printing apparatus which has an ink retaining member formed of a plate.

A further object of this invention is to provide a digital printing apparatus which has an ink retaining member formed of a roller.

Another object of this invention is to provide a digital printing apparatus which is provided with a plurality of ink retaining members and adapted to fix on one and the same recording paper an image formed of a plurality of inks different in color from one another.

In accordance with the present invention, there is provided a digital printing apparatus, comprising: ink retaining means provided with a multiplicity of minute surfaces possessing ink-wettability and corresponding to dots to be recorded on a recording medium, said ink-wettable minute surfaces each being enclosed with a ink-repellent part and adapted to retain ink thereon in a raised state; means for supplying ink to said ink retaining means; conveying means for conveying said recording medium contactless to said ink retaining means so as to oppose to each other; and means for causing the ink retained on said ink-wettable minute surfaces of said ink retaining means to be selectively deposited on said recording medium.

Further in accordance with the present invention, there is provided a digital printing apparatus, comprising: a rotary member provided on the periphery thereof with a multiplicity of ink-wettable minute surfaces for retaining ink to be deposited on a recording medium, said minute surfaces being divided by ink-repellent parts and adapted to retain ink thereon in a raised state; means for supplying ink to said ink-wettable minute surfaces of said rotary member; means for opposing said recording medium to the periphery of said rotary member and conveying said recording medium without permitting mutual contact; and means for enabling the ink retained on said ink-wettable minute surfaces of said rotary member to be selectively deposited on said recording medium.

DESCRIPTION OF THE PREFERRED EMBODIMENTS

Figure 1:
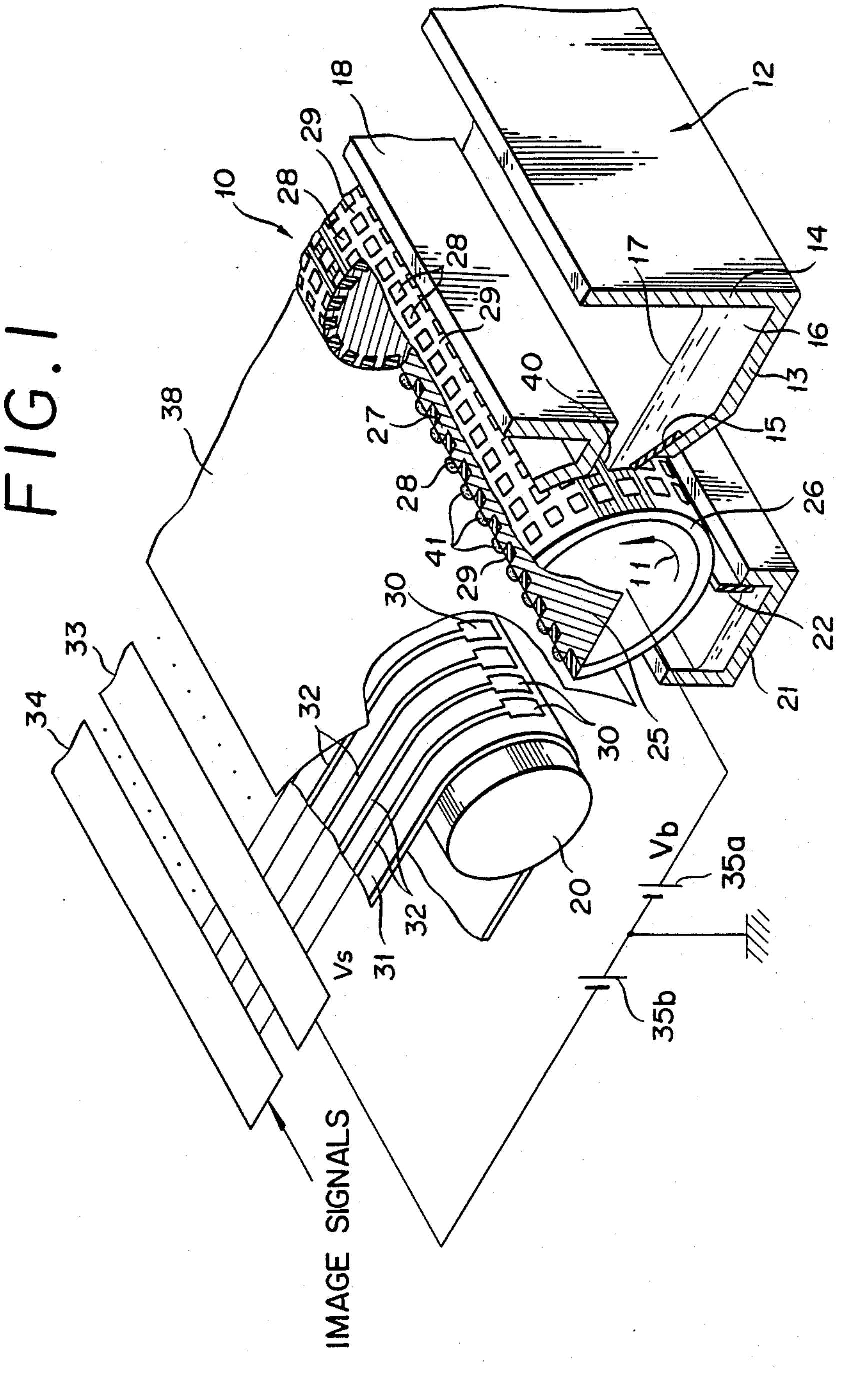
FIG. 1 is a partially cutaway perspective view illustrating the basic construction of a typical digital printing apparatus as one embodiment of the present invention.
Figure 2:
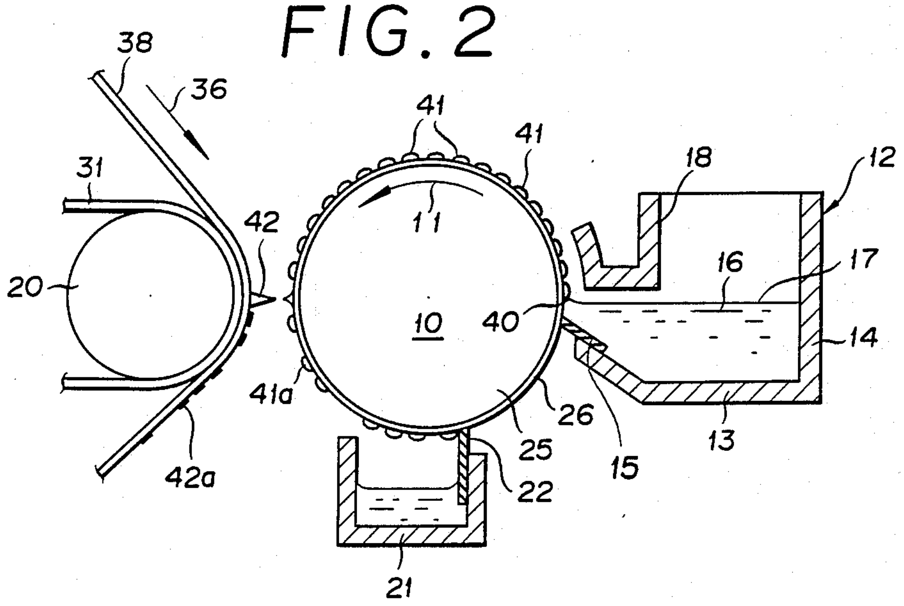
FIG. 2 is a partially cutaway front view of FIG. 1.

FIG. 1 and FIG. 2 schematically depict the construction of a digital printing apparatus as one embodiment of this invention. The digital printing apparatus of this invention is provided with a roller 10 adapted to retain ink on the periphery thereof. This roller 10 is rotated in the direction indicated by an arrow 11 in FIG. 2. An ink tank 2 for supplying ink to the surface of the roller 10 is disposed in the proximity of the roller 10. This ink tank 12 comprises a bottom wall part 13, a lateral wall part 14 rising from the lateral edge of the bottom wall part 13 and continuing into the bottom wall part 13, and a sealing blade or lip 15 made of rubber and adapted to contact the periphery of the roller 10. The lip 15 has a length equalling the length of the roller 10 in the direction along the axis of rotation thereof. The ink tank 12 as filled with ink 16 so much that a level 17 of the ink rises above the lip 15. In the ink 16, therefore, part of the periphery of the roller 10 is always kept immersed. The ink tank 12 is provided, as attached fast thereof, with a cover member 18 adapted to prevent the ink 16 from splashing out of the ink tank 12.

A platen 20 having a length equalling the length of the roller 10 is disposed as opposed to the ink tank 12 across the roller 10 and separated by a prescribed gap from the roller 10. Below the roller 10, an ink recovery tank 21 for the recovery of excess ink is disposed. The recovery tank 21 is furnished with a wiping blade or lip 22 made of rubber and adapted to contact the periphery of the roller 10.

The roller 10 comprises a core 25 formed of an electroconductive material and an insulating layer 26 superposed in a fixed thickness on the surface of the core 25. On the periphery of the core 25, a multiplicity of projected parts 27 are provided. Minute top surfaces 28 of the projected parts 27 are exposed out of the insulating layer 26. The minute exposed top surfaces 28 possess electroconductivity and ink wettability. They are arranged with a fixed pitch in the direction along the axis of the roller 10 and are also arranged with a fixed pitch in the circumferential direction of the roller. From the periphery of the roller 10 except for the top surfaces 28, the surface 29 of the insulating layer 26 is exposed. This surface 29 possesses ink repellency and insulating property. The ink-wettable top surfaces 28 are each in the form of a dot having a width of about 70 μm. In FIG. 1, they are depicted as exaggerated.

Figure 3A:
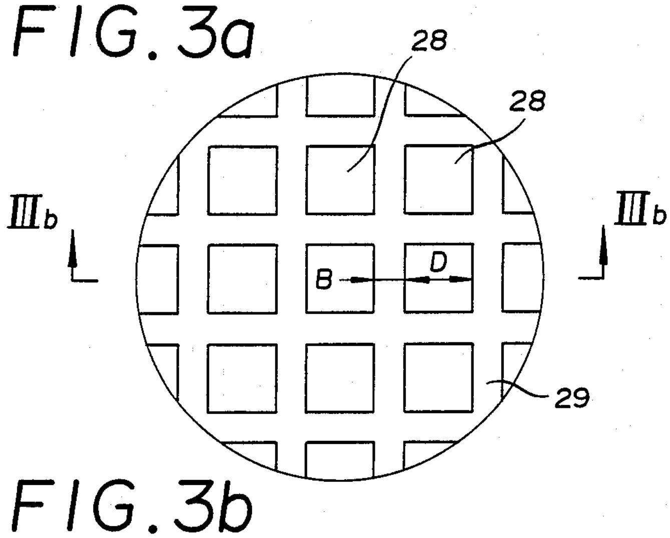
FIG. 3*a* is a plan view illustrating part of the surface of an ink retaining member illustrated in FIG. 1 and FIG. 2.
Figure 3B:
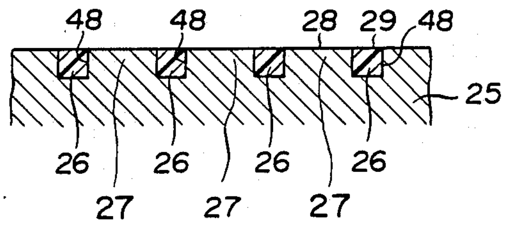
FIG. 3*b* is a cross section taken through FIG. 3*a* along the line IIIb—IIIb.

As illustrated in FIG. 3*a* and FIG. 3*b*, the top surfaces 28 each have as surface area thereof the square of about 70 μm (D) and the gap between the adjacent top surfaces 28, namely the width B of the surface 29, is about 30 μm.

The platen 20 is provided on the surface thereof with an insulating film 31 containing a multiplicity of control electrodes 30. The control electrodes 30 are arranged in one line as spaced with a fixed pitch in the direction of the axis of the roller 10, so that they are precisely opposed to the dot-shaped top surfaces 28. The widths of these control electrodes 30 are depicted as exaggerated in FIG. 1 similarly to those of the top surfaces 28.

Electrode lead parts 32 drawn out of the electrodes 30 are severally connected to a switch circuit 33. To permit application of control voltage $V_S$ to these electrode lead parts 32 in accordance with image signals, a pulse drive circuit 34 is connected to the switch circuit 33. The switch circuit 33 incorporates therein as many switching elements of power transistor as the control electrodes 30. These elements are adapted to be operated by pulse signals from the pulse drive circuit 34 mentioned above. The configuration of the switch circuit 33 and the pulse drive circuit 34 may be any of the known configurations popularly employed for the ON-OFF control of a heat-generating element in the technical field of thermalprinters. To the electroconductive core 25 of the roller 10 is electrically connected the positive pole side of a bias power source 35*a*. The negative pole side of the power source 35*a* is electrically connected to the switch circuit 33 via a bias power source 35*b*. The power source 35*a* is adapted to keep a high voltage, Vb, exceeding 1,000 V applied continuously to the electroconductive core 25.

A recording paper 38 is conveyed as indicated by an arrow 36 in such a manner as to be pressed against the insulating film 31 on the periphery of the platen 20.

To effect the formation of a given image on the recording paper 38 in accordance with image signals, the recording paper 38 is advanced as described above and, at the same time, the roller 10 is rotated counterclockwise as indicated by the arrow 11 in FIG. 2. In consequence of the rotation of the roller 10, the ink 16 in the ink tank 12 uniformly wets the periphery of the roller 10. At the time that the surface of the roller 10 now wet with the ink 16 is about to depart from the liquid level 17, the minute top surfaces or dot surfaces 28 tend to keep the ink 16 fast thereon because of their ink-wettability and the surface 29 of the insulating layer 26 tends to repel the ink 16 because of its ink-repellency. In the portion of contact points 40 at which the surface of the roller 10 comes into contact with the liquid level 17 (shown in the form of a line in FIG. 1), the ink 16 adhering to the dot surfaces 28 is drawn toward the liquid level by virtue of surface tension. As the actions mentioned above cooperate, prominences of ink 41 are formed as arcuately raised by surface tension only on the dot surfaces 28.

With the rotation of the roller 10, the prominences of ink 41 are advanced toward the recording part. When they reach a position at which they are precisely opposed to the control electrodes 30, the pulse drive circuit 45 is set operating to turn on those of the switching elements in the switch circuit 33 to be selected in accordance with image recording data for applying the control voltage $V_S$ to those of the control electrodes 30 electrically connected to the selected elements. As the result, those of the prominences of ink 41 which are opposed to the control electrodes 30 set in the ON status are caused to fly toward the respective control electrodes due to an electrostatic field of high magnitude formed between the control electrodes 30 and the corresponding projected parts 27. The beads of ink 42 is thus sent onto the recording paper 38 to form record dots 42*a* as illustrated in FIG. 2. The portion of the prominences of ink 41*a* which has not participated in the recording is wiped off the periphery of the roller 10 by the lip 22 and received in the recovery tank 21.

Figure 4A:
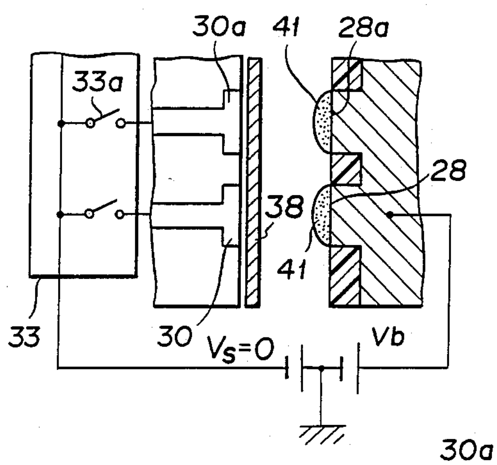
FIG. 4*a* to FIG. 4*e* are magnified cross sections illustrating the state of flight of ink.
Figure 4B:
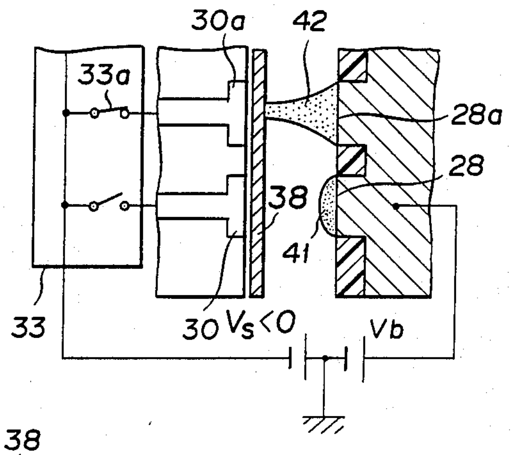
Figure 4C:
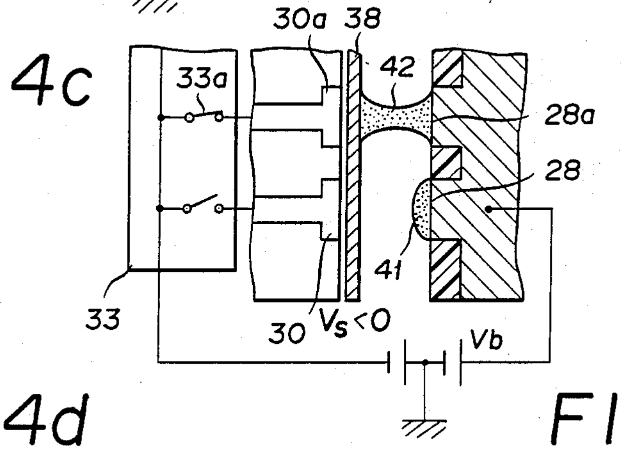
Figure 4D:
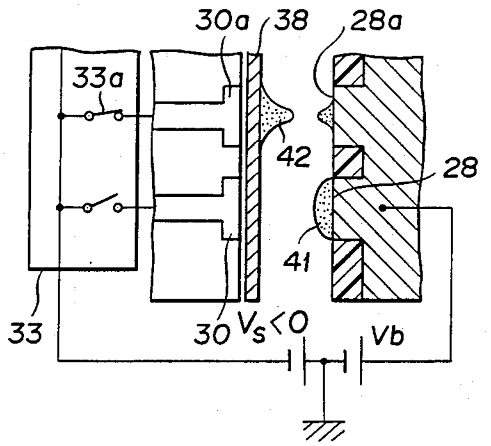
Figure 4E:
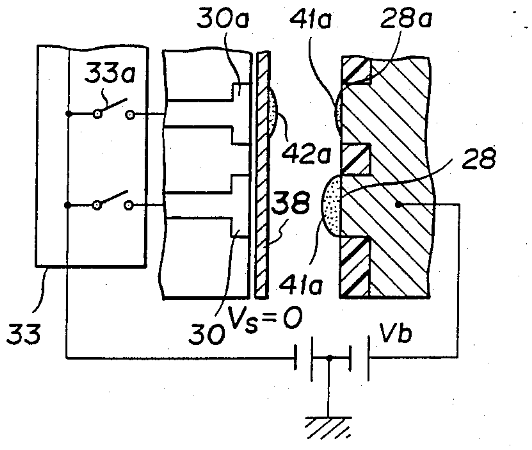

FIG. 4*a* to FIG. 4*e* are magnified diagrams illustrating the state of flight of the prominences of ink 41 along the course of time. While the pulse drive circuit 34 is in the OFF state, the control voltage $V_S$ is zero and the surface of the prominence of ink 41 is positively charged as by polarization of liquid molecule caused by the bias voltage Vb as illustrated in FIG. 4*a*. When the pulse drive circuit 34 receives an image signal and feeds out a pulse signal in response to turn on a switching element 33*a*, for example, in the switch circuit 33, the control voltage $V_S$ is applied to the control electrode 30*a* which corresponds to the switching element 33*a* as illustrated in FIG. 4*b*. As the result, a high electric field is formed between the electrode 30*a* and the corresponding dot surface 28*a* and the prominence of ink 41 as a charged particle is attracted to the control electrode 30*a* on the negative side by virtue of Coulomb's force. Since the dot surface 28*a* is in an ink-wettable state, the prominence of ink 41 tends to remain fast thereon. The ink particle 42 in flight which is first in the shape illustrated in FIG. 4*b* is deformed through the shape illustrated in FIG. 4*c* to that illustrated in FIG. 4*d*. The distance between the roller 10 and the control electrode 30, namely the gap for flight of the ink is fixed in the neighborhood of 130 μm.

The width of the ink particle 42 in flight is nearly equal or smaller than the width of the dot surface 28. Thus, the printer of this invention produces an image of much higher resolution. In the illustrated embodiment, the bias voltage Vb is set at 1,100 volts and the pulse signal voltage $V_S$ at −600 volts. When the printer was operated to produce a record at a speed of 10 ms per line there was obtained a clear image possessing resolution of 10 dots/mm. The electric current which flows during the flight of ink particle is only on the order of several nA and the amount of electric current consumed for the recording, therefore is very small.

The amount of the ink 42 to be sent flying to the recording paper 38 from the prominence of ink 41 can be adjusted by varying the width of the voltage $V_S$ applied to the control electrode 30 with the signal from the pulse drive circuit 34. Thus, the formation of an image with plurality of gradation can be attained.

The pulse drive circuit 34 is turned on at the time that one line of dot surfaces 28 arranged in the axial direction of the roller 10 or the direction of the width of the recording paper 38 reaches a position at which the line is precisely opposed to the line of control electrodes 30. One example of the timing for the application of the control voltage $V_S$ is illustrated in FIG. 5.

Figure 5:
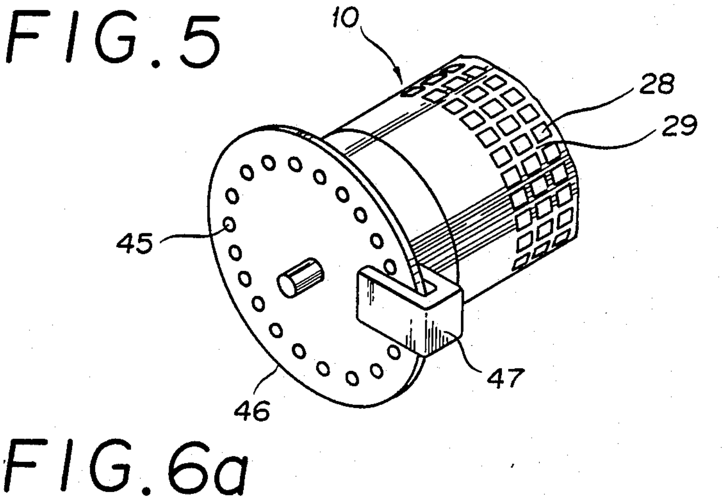
FIG. 5 is a perspective view illustrating a typical control device for controlling the operational timing of a roller and control electrodes illustrated in FIG. 1 and FIG. 2.

As illustrated in FIG. 5, a disk 46 having a multiplicity of position detection holes 45 bored therein is attached coaxially to the roller 10 in such a manner that the lines of dot surfaces 28 running along the axial direction of the roller 10 coincide with the position detection holes. When one of the position detection holes 45 reached a photocoupler 47, the photocoupler 47 detects the arrival of the hole 45 and, in response, issues a signal for timing the generation of the control voltage $V_S$.

The digital printing apparatus has been described as requiring the dot surfaces 28 and the ink-repellent surfaces 29 to coincide with each other. Optionally, these two groups of surfaces may be arranged in a staggered pattern. The coinciding arrangement offers an advantage that the overall periphery of the roller 10 has a smooth surface throughout and, therefore, enables the recovery of excess ink adhering thereto to be effected completely with the lip 22. It further produces an advantage that the ink is not suffered to splash in the ink supplying part even when the roller 10 is rotated at a high speed.

Now, the method for manufacture of the roller 10 will be described below. On the surface of a cylinder of stainless steel destined to form the core 25, grooves 48 of a cross section illustrated in FIG. 3*b* are incised in the pattern of a grating by the technique of photolithographic etching. These grooves 48 have a width of 30 μm. The distance between the center lines of two adjacent grooves 48 is 100 μm. Then styrene monomer is applied to the entire periphery of the cylinder of stainless steel now containing the incised grooves 48. The coating of styrene monomer on the cylinder is cured by polymerizing the monomer by means of application of heat or exposure to light. After the styrene polymer has hardened, the surface of the styrene polymer coating is abraded to expose the top surfaces of projected parts 27, namely the dot surfaces 28. As the result, an insulating layer 26 is formed and the styrene polymer remains inside the grooves 48. There is obtained a roller 10 provided with dot surfaces 28 at a density of 10 dots/mm.

The insulating layer 26 may be otherwise formed of a plasma polymerized carbon film obtained by plasma polymerizing a hydrocarbon or a hydrocarbon compound in the place of the styrene polymer film mentioned above. Preferably, this plasma polymerized carbon film contains hydrogen and/or a halogen. The insulating layer 26 formed of this plasma polymerized film exhibits the ink-repellency to a greater extent than that of the styrene polymer film. Further, when the film is produced by plasma polymerization, a strong insulting material of highly desirable adhesiveness is uniformly formed inside the grooves 48.

The ink 16 is an infrared-absorbing black ink which is composed of a solvent, a wetting agent, a coloring agent, and additives in the proportions (%) of 87.3, 5.6, 5.0, and 2.1. The components making up these agents are as follows.

| | |
|---|---|
| (Solvent) | |
| Deionized distilled water | 84.2 |
| Butyl carbitol | 3.1 |
| (Wetting agent) | |
| N—methyl-2-pyrrolidone | 0.1 |
| Triethylene glycol | 5.5 |
| (Coloring agent) | |
| CI-solubilized sulfur black 1 | 5.0 |
| (Additives) | |
| Polyethylene imine PEI-6 (water-resisting agent) | 1.5 |
| Surfinol 104 (surfactant) | 0.1 |
| 8-Quinolyl citrate (bactericide) | 0.2 |
| Sodium carbonate (pH buffer agent) | 0.3 |

Figure 6A:
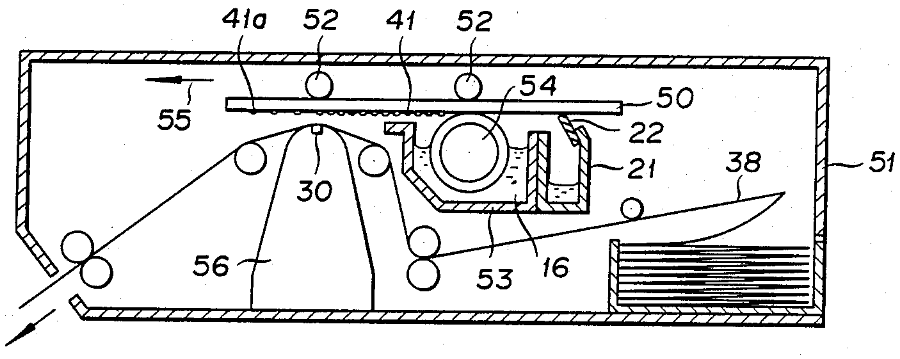
FIG. 6*a* is a cross section illustrating a typical digital printing apparatus as another embodiment of this invention.
Figure 6B:
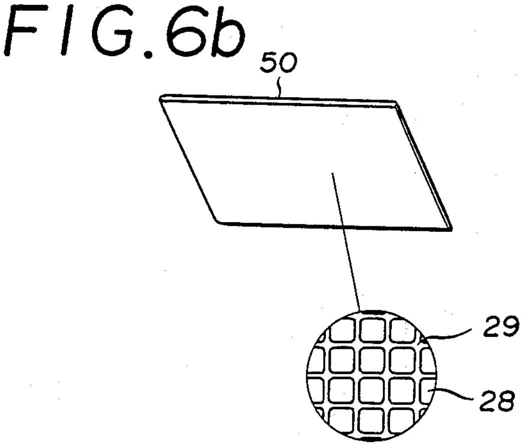
FIG. 6*b* is a perspective view illustrating the lower surface of a plate-like ink retaining member illustrated in FIG. 6*a*.

FIG. 6*a* and FIG. 6*b* are diagrams illustrating a typical digital printing apparatus as another embodiment of this invention. This embodiment uses a plate 50 as a countertype of the roller 10 used as an ink retaining member in the preceding embodiment. This plate 50 is mounted on rails (not shown) as to be reciprocated freely in the upper part of the interior of a housing 51. For the purpose of imparting a reciprocating motion to the plate 50, upper drive rollers 52 and lower drive rollers (not shown) are disposed inside the housing 51. The plate 50 is reciprocated by the upper and lower drive rollers as nipped between these rollers. These drive rollers 52 may be substituted with belts or rack and pinions. On the lower surface of this plate 50, dot surfaces 28 possessing ink-wettability are arranged at fixed pitches in the longitudinal direction and the lateral direction similarly to those on the roller 10 mentioned above. A surface 29 of an insulating layer 26 possessing ink-repellency occupies the remaining part of the lower surface of the plate 50.

An ink tank 53 is disposed below the plate 50. For supply of ink 16 held in the ink tank 53 to the lower surface of the plate 50, an ink application roller 54 intended for contact with the lower surface of the plate 50 is rotatably attached inside the ink tank 53. As the plate 50 advances in the direction indicated by an arrow 55, the ink application roller 54 applies the ink successively to the dot surfaces 28 on the lower surface of the plate. Inside the housing 51 is also disposed a platen 56 which has control electrodes 30 arranged at a fixed pitch on the upper surface thereof in the direction of the width of the plate 50.

A recording paper 38 is conveyed as synchronized with the speed of advance of the plate 50, with the rear surface thereof held fast on the control electrodes 30. When the plate 50 reaches the limit of its advance, one page of recording is completed. Then, the plate 50 is rapidly returned to the starting point of travel and readied for the next page of recording. During the return of the plate 50, the ink supplying roller 54 is kept at a lower level at a distance from the lower surface of the plate 50. For the purpose of enabling the portion of prominences of ink which has not taken part in the recording to be removed from the lower surface of the plate 50 during the return of the plate, there is disposed a recovery tank 21 which is provided with a wiping lip 22. When the lip 22 is attached to the ink tank 53, this ink tank 53 functions concurrently as an ink recovery tank 22. This arrangement serves the purpose of decreasing the waste of ink.

Figure 7:
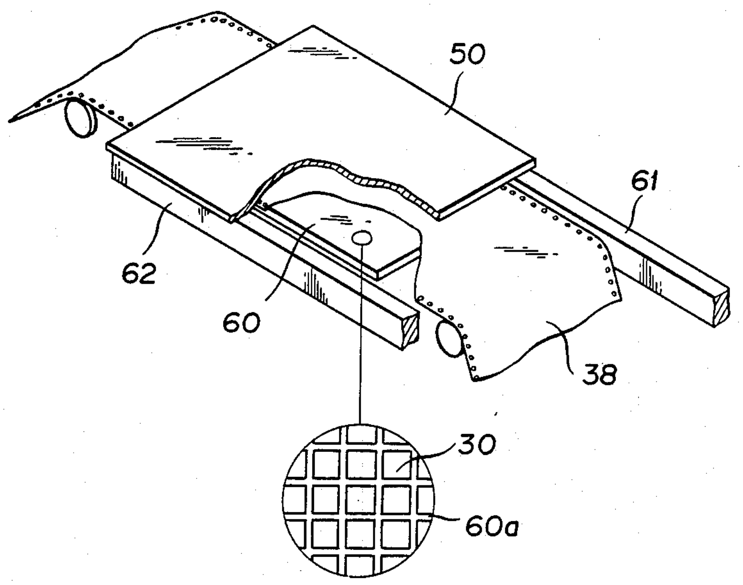
FIG. 7 is a partially cutaway perspective view illustrating the basic construction of a typical digital printing apparatus as still another embodiment of the present invention.

FIG. 7 illustrates a typical digital printing apparatus as still another embodiment of this invention. In this embodiment, a plate 50 is used as an ink retaining member similarly to the plate in the embodiment of FIG. 6. This plate is allowed to reciprocate freely by having the opposite lateral ends thereof supported on rails 61, 62. In this embodiment, an electrode plate 60 is fixed below the plate 50. This electrode plate 60 has a surface area equalling that of one page of recording paper, for example. On the surface of this electrode plate 60, electrodes 30 having a width equalling that of the dot surfaces 28 formed on the lower surface of the aforementioned plate 50 are arranged at the same pitch in the longitudinal direction and the lateral direction. The part of the surface of the electrode plate 60 except these electrodes 30 forms a surface 60*a* exposing an insulating material as a substrate for the electrode plate 60. In the present embodiment, one page full of images are recorded on the recording paper 38 at one time. Simultaneous recording of a plurality of lines of images can be realized by decreasing the length of the electrode plate 60.

In the digital printing apparatus contemplated by the present invention, adoption of the combination of an electrode plate having a length equivalent to a plurality of lines and a roller-shaped ink retaining member used in the embodiment of FIG. 1 and FIG. 2 is optional. In this case, the electrode plate is given a concave surface with conforms with the periphery of the roller-shaped in retaining member.

In another modified configuration of the digital printing apparatus, the necessity for using the ink application roller 54 as illustrated in FIG. 6*a* may be obviated by adapting the ink retaining member of the shape of a plate or roller in such a manner that the application of ink to the surface of the ink retaining member will be attained by dipping the ink retaining member in a pool of ink and then lifting it out of the ink pool.

Figure 8:
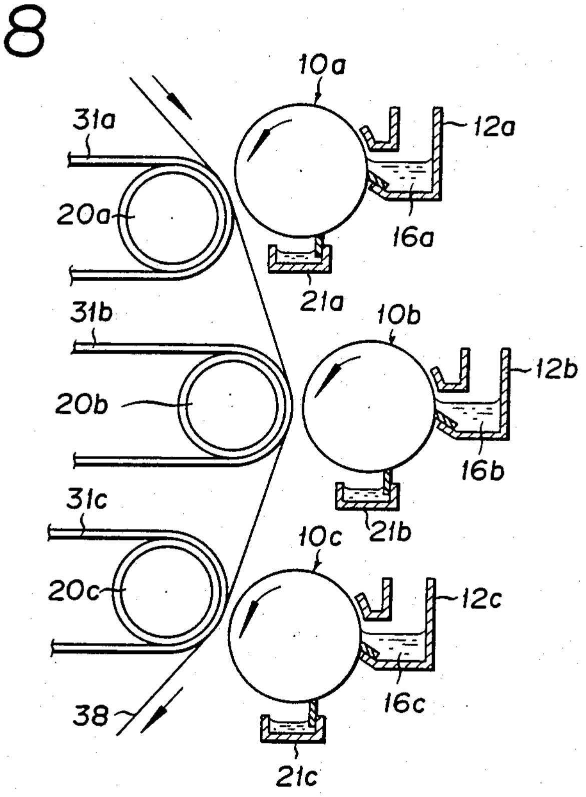
FIG. 8 is a partially cutaway from view illustrating the basic construction of a typical digital printing apparatus as yet another embodiment of this invention.

FIG. 8 illustrates a typical digital printing apparatus as a further embodiment of this invention for realizing the recording of a color image. This digital printing apparatus has the same basic construction as the apparatus illustrated in FIG. 1 and FIG. 2. Three rollers 10a, 10b, and 10c each designed as an ink retaiiing member fulfilling the role of a printer head are disposed in a generally vertical line. An ink tank 12a for supply of ink to the periphery of the roller 10a contains yellow ink 16a, so that the roller 10a is enabled to record a yellow image on a recording paper 38. An ink tank 12b for supply of ink to the periphery of the roller 10b contains magenta ink 16b, so that the roller 10b is enabled to record a magenta image on the recording paper 38. Then, an ink tank 12c for supply of ink to the periphery of the roller 10c contains cyan ink 16c, so that the roller 10c is enabled to record a cyan image on the recording paper 38. Platens 20a, 20b, and 20c are juxtaposed closely to the roller 10a, 10b, and 10c respectively. These platens are provided respectively with insulating films 31a, 31b, 31c each of the same kind as illustrated in FIG. 1.

Optionally, a head part for recording an image with black ink may be additionally used besides the three printer head parts illustrated in FIG. 8. The digital printing apparatus of this embodiment may be modified so as to use two printer head parts instead of three.

The digital printing apparatus of this invention attains the formation of prominences of ink each in the shape of a dot by virtue of the difference of ink wettability between the multiplicity of ink-wettable dot surfaces and the ink-repellent surfaces enclosing the dot surfaces and the phenomenon of surface tension of ink and, therefore, ovbiates the necessity for using a special ink such as the ink containing magnetic particles and permits use of a plurality of kinds of ink. When the entire surface of the ink retaining member is brought into contact with the ink, the ink is gathered only on the dot surfaces. Thus, the supply of the ink can be effected stably and the apparatus itself can be maintained with ease. Even when the apparatus is used continuously for a long time, the possibility that the ink will suffer from decrease of density or the smooth flow of ink will be interrupted is completely absent.

What is claimed is:

1. A digital printing apparatus, comprising:

ink retaining means provided with a multiplicity of minute surfaces possessing ink-wettability and corresponding to dots to be recorded on a recording medium, said ink-wettable minute surfaces each being enclosed with a ink-repellent part and adapted to retain ink thereon in a raised state;

means for supplying ink to said ink retaining means;

conveying means for conveying said recording medium contactless to said ink retaining means so as to oppose to each other; and means for causing the ink retained on said ink-wettable minute surfaces of said ink retaining means to be selectively deposited on said recording medium.

2. A digital printing apparatus according to claim 1, wherein said means for deposition of ink effects deposition of ink on said recording medium electrostatically by the formation of an electric field.

3. A digital printing apparatus according to claim 2, wherein said means for deposition of ink comprises a first electrode member adapted to contact the ink retained on said ink retaining means, a second electrode member disposed as opposed to said first electrode member across said recording medium, and means for selectively forming an electric field between said first and second electrode members.

4. A digital printing apparatus according to claim 3, wherein said first electrode member is commonly disposed with the ink on said ink-wettable minute surfaces.

5. A digital printing apparatus according to claim 4, wherein said second electrode member comprises as many electrodes as the dots to be recorded on said recording medium, said electrodes being arranged at least in the direction of width of said recording medium.

6. A digital printing apparatus according to claim 1, wherein said conveying means cause said recording medium to move and said ink retaining means is moved as synchronized with the movement of said recording medium.

7. A digital printing apparatus according to claim 6, wherein said ink retaining means is formed with a rotatable member and has said ink-wettable minute surfaces formed on the periphery of said member.

8. A digital printing apparatus according to claim 1, wherein said ink-wettable minute surfaces fall flush with the ink-repellent parts.

9. A digital printing apparatus according to claim 8, which further comprises means for recovery of the ink adhering to said ink-wettable minute surfaces.

10. A digital printing apparatus according to claim 9, wherein said recovery means incorporates therein a blade adapted to contact said ink-wettable minute surfaces.

11. A digital printing apparatus, comprising:

a rotary member provided on the periphery thereof with a multiplicity of ink-wettable minute surfaces for retaining ink to be deposited on a recording medium, said minute surfaces being divided by ink-repellent parts and adapted to retain ink thereon in a raised state;

means for supplying ink to said ink-wettable minute surfaces of said rotary member;

means for opposing said recording medium to the periphery of said rotary member and conveying said recording medium without permitting mutual contact; and means for enabling the ink retained on said ink-wettable minute surfaces of said rotary member to be selectively deposited on said recording medium.

12. A digital printing apparatus according to claim 11, wherein said means for deposition of ink effects deposition of ink on said recording medium electrostatically by the formation of an electric field.

13. A digital printing apparatus according to claim 12, wherein said rotary member possesses an electroconductive substrate and has said ink-repellent parts formed on said substrate and the exposed surfaces of said substrate excepting the surfaces forming said ink-repellent parts correspond to said ink-wettable minute surfaces.

14. A digital printing apparatus according to claim 13, wherein said means for deposition comprises electrodes disposed as opposed to said rotary member across said recording medium and means for forming an electric field between said electrodes and the substrate of said rotary member.

15. A digital printing apparatus according to claim 14, wherein said electrodes are disposed correspondingly to the dots to be recorded on said recording medium at least in a .direction perpendicular to the direction of advance of said recording medium.

16. A digital printing apparatus according to claim 15, wherein said means for deposition forms an electric field as synchronized with the rotation of said rotary member.

17. A digital printing apparatus according to claim 12, wherein said ink-wettable minute surfaces are formed correspondingly to the dots to be recorded on said recording medium.

18. A digital printing apparatus according to claim 17, wherein said ink-wettable minute surfaces are enclosed with ink-repellent parts.

19. A digital printing apparatus according to claim 17, wherein said ink-wettable minute surfaces are each divided in the axial direction of said rotary member.

20. A digital printing apparatus according to claim 11, which further comprises means for recovering the ink remaining on said ink-wettable minute surfaces.

21. A digital printing apparatus according to claim 20, wherein said recovery means incorporates therein a blade adapted to contact the periphery of said rotary member.

* * * * *